United States Patent
Liu et al.

(10) Patent No.: US 10,917,338 B2
(45) Date of Patent: Feb. 9, 2021

(54) SYSTEM AND METHOD FOR BUILDING A HIERARCHICAL DATA STRUCTURE

(71) Applicants: Yaoqing Liu, Potsdam, NY (US); Garegin Grigoryan, Potsdam, NY (US)

(72) Inventors: Yaoqing Liu, Potsdam, NY (US); Garegin Grigoryan, Potsdam, NY (US)

(73) Assignee: Clarkson University, Potsdam, NY (US)

(*) Notice: Subject to any disclaimer, the term of this patent is extended or adjusted under 35 U.S.C. 154(b) by 50 days.

(21) Appl. No.: 16/294,171

(22) Filed: Mar. 6, 2019

(65) Prior Publication Data

US 2019/0280969 A1   Sep. 12, 2019

Related U.S. Application Data

(60) Provisional application No. 62/639,434, filed on Mar. 6, 2018.

(51) Int. Cl.
- *H04L 12/741* (2013.01)
- *H04L 12/753* (2013.01)
- *H04L 12/745* (2013.01)

(52) U.S. Cl.
CPC .............. *H04L 45/54* (2013.01); *H04L 45/48* (2013.01); *H04L 45/748* (2013.01)

(58) Field of Classification Search
CPC ........ H04L 45/54; H04L 45/48; H04L 45/748
See application file for complete search history.

(56) References Cited

U.S. PATENT DOCUMENTS

| | | | | |
|---|---|---|---|---|
| 6,396,842 B1* | 5/2002 | Rochberger | ............ | H04L 45/02 370/255 |
| 9,491,087 B1* | 11/2016 | Zhang | ................... | H04L 45/745 |
| 2005/0027710 A1* | 2/2005 | Ma | ...................... | G06F 16/2465 |
| 2013/0268542 A1* | 10/2013 | Dinwoodie | ........... | H04L 45/748 707/748 |
| 2014/0365500 A1* | 12/2014 | Futamura | ............ | G06F 16/2246 707/743 |

(Continued)

OTHER PUBLICATIONS

Zartash et al. SMALTA: Practical and Near-Optimal FIB Aggregation, Dec. 6, 2011 ACM 978-1-4503-1041-3/11 pp. 1-9.*

(Continued)

*Primary Examiner* — Ajit Patel
*Assistant Examiner* — Wilfred Thomas
(74) *Attorney, Agent, or Firm* — Bond Schoeneck & King, PLLC; George McGuire

(57) ABSTRACT

A system and method for building a data structure for determining if multiple routing or forwarding tables yield the same or different forwarding behaviors. VeriTable uses a single tree/trie traversal to quickly check if multiple forwarding tables are forwarding equivalent, yield routing loops, or black holes. VeriTable also uses the Longest Prefix Matching rule for lookups, e.g., checking if route updates in control plane are consistent with the ones in forwarding plane. VeriTable can be applied to network-wide abnormality diagnosis of network problems, such as scalable and efficient forwarding loop detection and avoidance in the data plane of a network. In addition, VeriTable can be extended to handle incremental updates applied to the forwarding tables in a network.

9 Claims, 15 Drawing Sheets

TABLE I: FIB Table Forwarding Equivalence

(a) FIB table 1

| Prefix | Next hop |
|---|---|
| - | A |
| 000 | B |
| 01 | B |
| 11 | A |
| 1011 | A |

(b) FIB table 2

| Prefix | Next hop |
|---|---|
| - | B |
| 001 | A |
| 1 | A |
| 100 | A |

(56) References Cited

U.S. PATENT DOCUMENTS

| | | | |
|---|---|---|---|
| 2015/0160966 A1* | 6/2015 | Archer | H04L 67/10 718/102 |
| 2017/0255682 A1* | 9/2017 | Pounds | G06F 16/2246 |
| 2019/0280969 A1* | 9/2019 | Liu | H04L 45/48 |

OTHER PUBLICATIONS

Ahsan et al. TaCo: Semantic Equivalence of IP Prefix Tables, 2011, IEEE, 978-1-4577-0638-7 /11.*

* cited by examiner

TABLE I: FIB Table Forwarding Equivalence (a) FIB table 1

| Prefix | Next hop |
|--------|----------|
| -      | A        |
| 000    | B        |
| 01     | B        |
| 11     | A        |
| 1011   | A        |

(b) FIB table 2

| Prefix | Next hop |
|--------|----------|
| -      | B        |
| 001    | A        |
| 1      | A        |
| 100    | A        |

FIG. 1

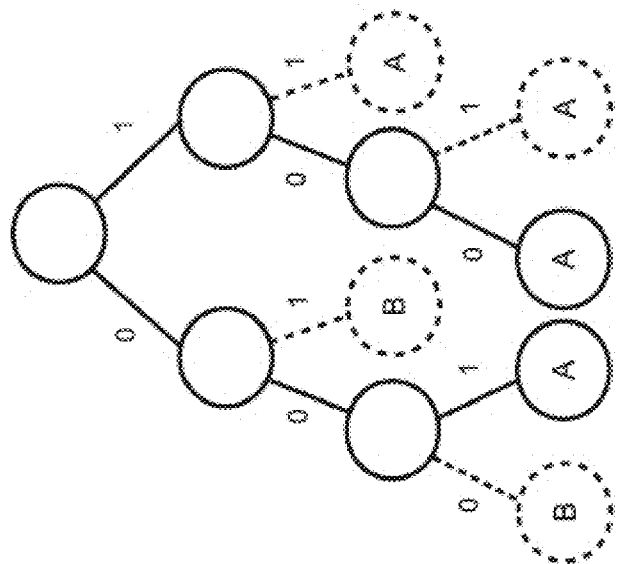
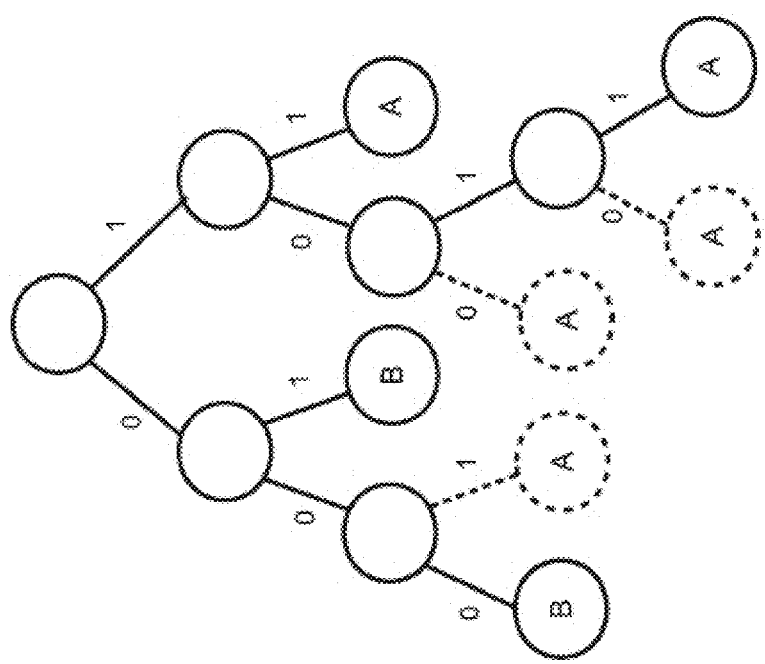
FIG. 3

TABLE II: Trie Node's Attributes

| Name | Data Type | Description |
|---|---|---|
| *parent* | Node Pointer | Points to a node's parent node |
| *l* | Node Pointer | Points to a node's left child node if exists |
| *r* | Node Pointer | Points to a node's right child node if exists |
| *prefix* | String | Binary string |
| *length* | Integer | The length of the prefix, 0-32 for IPv4 or 0-128 for IPv6 |
| *nexthop* | Integer Array | Next hops of this prefix in $T_1...T_n$, size $n$ |
| *type* | Integer | Indicates if a node is a *GLUE* or *REAL* |

FIG. 6

```
Algorithm 1 Building a Joint PT T
 1: procedure BuildJointPT(T_{1..n})
 2:     Initialize a PT T with its head node
 3:     Add prefix 0/0 on its head node.
 4:     Set default next hop values in the Next Hops array.
 5:     for each table T_i ∈ T_{1..n} do
 6:         for each entry e in T_i do
 7:             Find a node n in T such as n.prefix is a
                longest match for e.prefix in T
 8:             if n.prefix = e.prefix then
 9:                 n.nexthop_i ← e.nexthop
10:                 n.type ← REAL
11:             else
12:                 Generate new node n'
13:                 n'.prefix ← e.prefix
14:                 n'.nexthop_i ← e.nexthop
15:                 n'.type ← REAL
16:                 Assume n has a child n_c
17:                 if the overlapping portion of n_c and n' is
    longer than n.length but shorter than n'.length bits then
18:                     Generate a glue node g
19:                     n'.parent ← g
20:                     n_c.parent ← g
21:                     g.parent ← n
22:                     g.type ← GLUE
23:                     Set g as a child of n
24:                     Set n' and n_c as children of g
25:                 else
26:                     n'.parent ← n
27:                     n_c.parent ← n'
28:                     Set n_c as a child of n'
29:                     Set n' as a child of n
30:                 end if
31:             end if
32:         end for
33:     end for
34: end procedure
```

FIG. 7

Algorithm 2 Forwarding Equivalence Verification. The initial value of *ancestor* is $NULL$, and the initial value of *node* is $T \to root$. For simplicity, we assume the root node is $REAL$.

```
 1: procedure VeriTable(ancestor, node)
 2:     if node.type = REAL then
 3:         ancestor = node
 4:     end if
 5:     l ← node.l
 6:     r ← node.r
 7:     if l ≠ NULL then
 8:         if l.type = REAL then
 9:             InheritNextHops(ancestor, l)
10:         end if
11:         LeftFlag ← VeriTable(ancestor, l)
12:     end if
13:     if r ≠ NULL then
14:         if r.type = REAL then
15:             InheritNextHops(ancestor, r)
16:         end if
17:         RightFlag ← VeriTable(ancestor, r)
18:     end if
19:     if l = NULL ∧ r = NULL then
20:         CompareNextHops(node)
21:         LeakFlag ← False
22:         return LeakFlag
23:     end if
24:     if l ≠ NULL ∧ l.length − node.length > 1 then
25:         LeakFlag ← True
26:     else if r ≠ NULL ∧ r.length − node.length > 1 then
27:         LeakFlag ← True
28:     else if l = NULL ∨ r = NULL then
29:         LeakFlag ← True
30:     else if LeftFlag = True ∨ RightFlag = True then
31:         LeakFlag ← True
32:     end if
33:     if LeakFlag = True ∧ node.type = REAL then
34:         CompareNextHops(node)
35:         LeakFlag ← False
36:     end if
       return LeakFlag
37: end procedure
```

FIG. 9

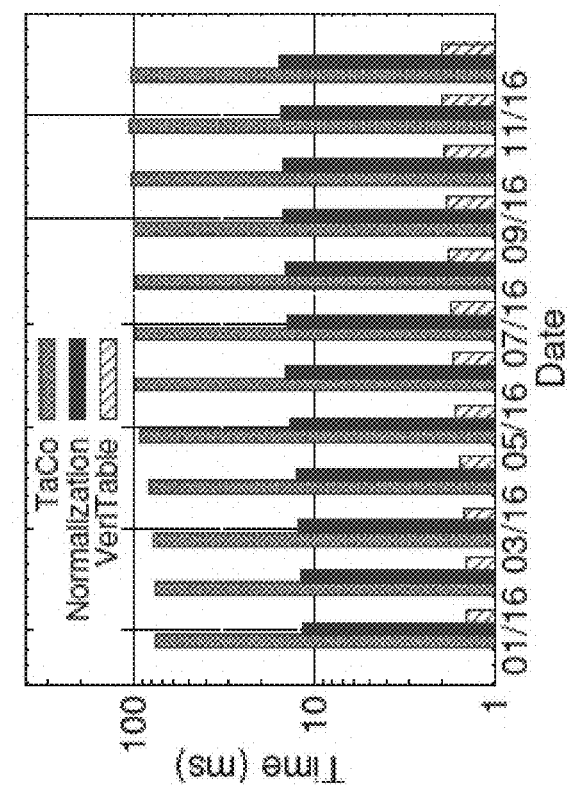
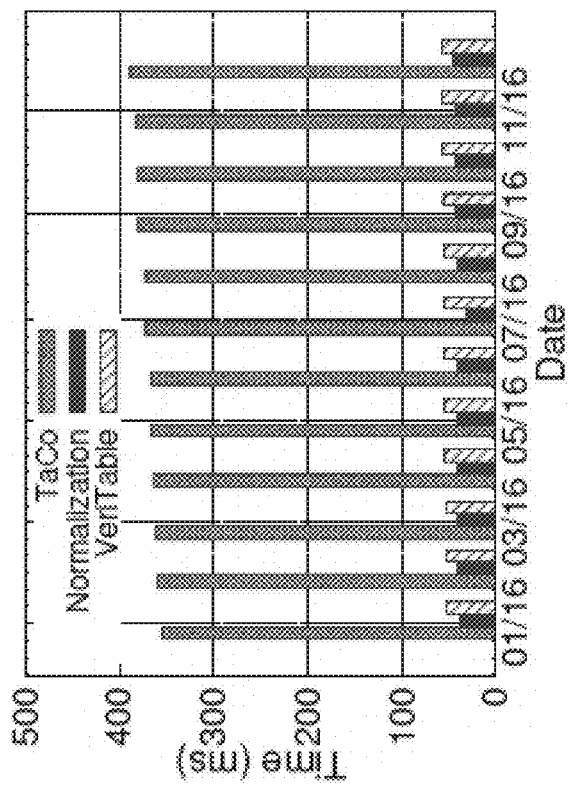
FIG. 11

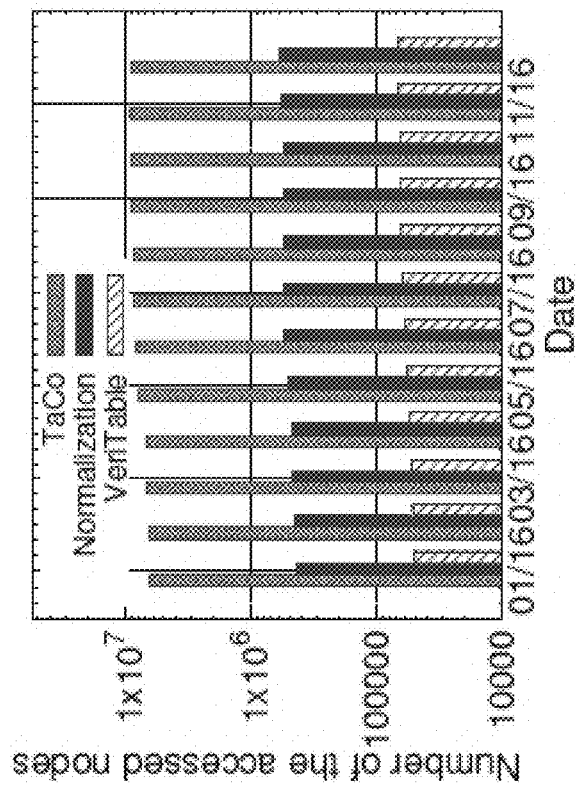
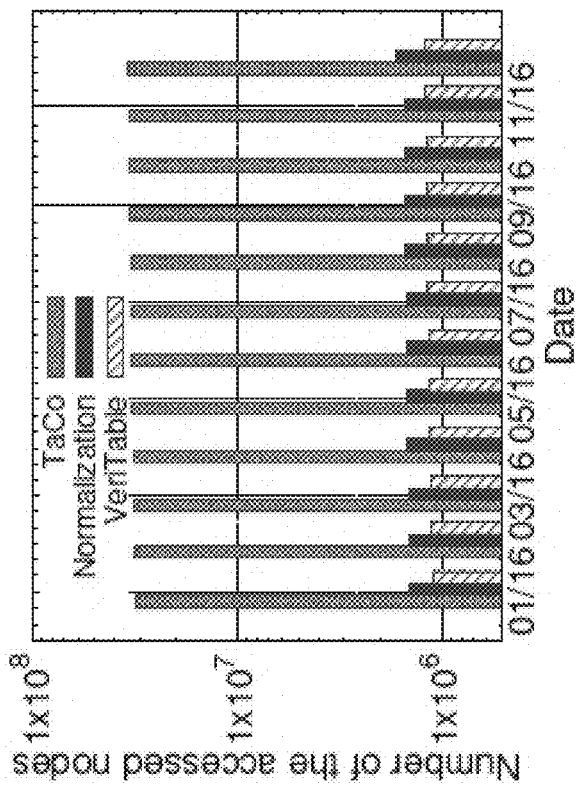
FIG. 12

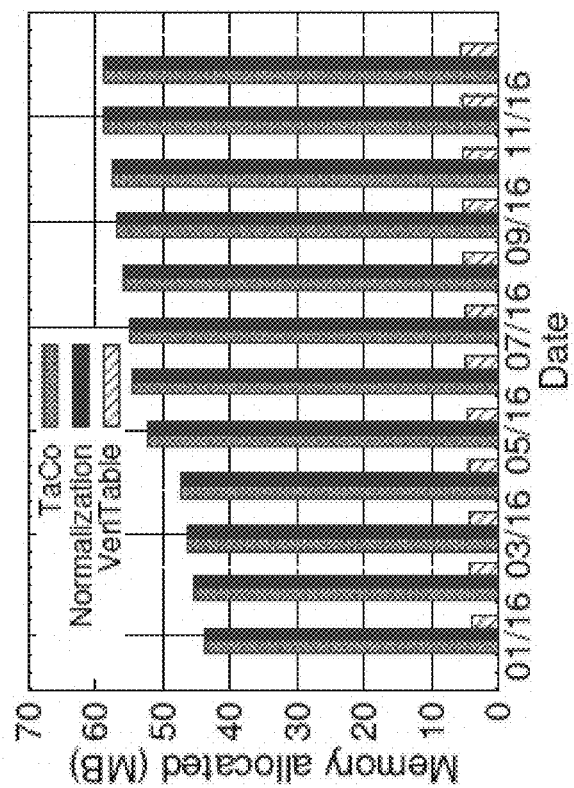
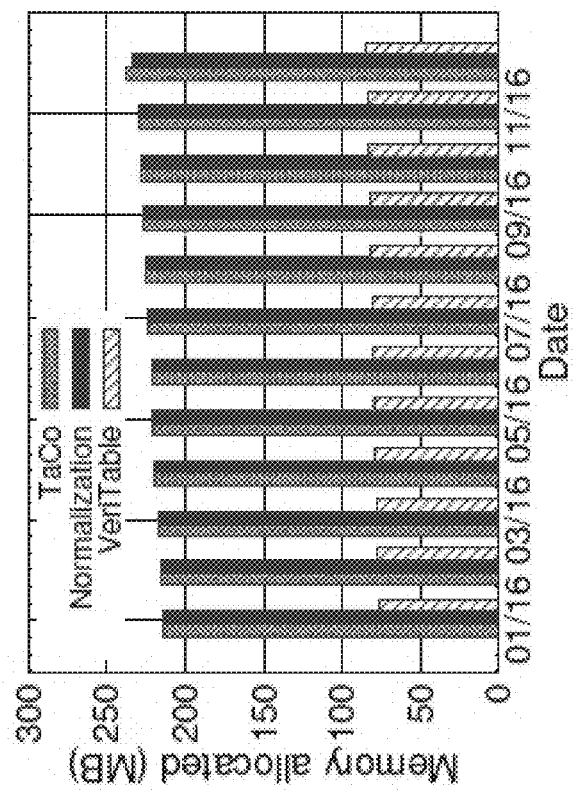
FIG. 13

TABLE III: Results of Comparing 10 IPv4 FIB Tables Simultaneously

| Number of tables | Total number of entries | Building time(ms) | Verification time (ms) | Number of comparisons | Node access times | Number of errors | Memory (MB) |
|---|---|---|---|---|---|---|---|
| 2 | 1230512 | 962 | 82 | 586942 | 1133115 | 4000 | 84 |
| 3 | 1845768 | 1326 | 108 | 1175884 | 1137115 | 6000 | 94 |
| 4 | 2461024 | 1684 | 135 | 1766826 | 1141115 | 8000 | 104 |
| 5 | 3076280 | 2060 | 172 | 2359768 | 1145115 | 10000 | 114 |
| 6 | 3691536 | 2471 | 194 | 2954710 | 1149115 | 12000 | 124 |
| 7 | 4306792 | 2869 | 213 | 3551652 | 1153115 | 14000 | 134 |
| 8 | 4922048 | 3248 | 224 | 4150594 | 1157115 | 16000 | 145 |
| 9 | 5537304 | 3630 | 322 | 4751536 | 1161115 | 18000 | 155 |
| 10 | 6152560 | 4007 | 337 | 5354478 | 1165115 | 20000 | 165 |

FIG. 14

TABLE IV: One-to-one Comparison of Individual Routing Tables with the Merged Super Table

| Table size | Router IP | ASN | BGP peers | Leaking Routes |
|---|---|---|---|---|
| 673083 | 203.189.128.233 | 23673 | 204 | 489 |
| 667062 | 202.73.40.45 | 18106 | 1201 | 507 |
| 658390 | 103.247.3.45 | 58511 | 1599 | 566 |
| 657232 | 198.129.33.85 | 292 | 153 | 495 |
| 655528 | 64.71.137.241 | 6939 | 6241 | 667 |
| 655166 | 140.192.8.16 | 20130 | 2 | 879 |
| 646912 | 85.114.0.217 | 8492 | 1504 | 796 |
| 646892 | 195.208.112.161 | 3277 | 4 | 772 |
| 641724 | 202.232.0.3 | 2497 | 294 | 1061 |
| 641414 | 216.221.157.162 | 3257 | 316 | 1239 |

FIG. 15

SYSTEM AND METHOD FOR BUILDING A HIERARCHICAL DATA STRUCTURE

CROSS-REFERENCE TO RELATED APPLICATIONS

This application claims priority to U.S. Provisional Patent Application Ser. No. 62/639,434, filed on Mar. 6, 2018 and entitled "VeriTable: Fast Equivalence Verification of Multiple Large Forwarding Tables," the entirety of which is incorporated herein by reference.

BACKGROUND OF THE INVENTION

1. Field of the Invention

The present invention is directed generally to a system and method for building a data structure and, more particularly, to a data structure for determining if multiple routing or forwarding tables yield the same or different forwarding behaviors.

2. Description of Related Art

There are various scenarios where verification of two or more routing or forwarding tables residing in the same or different routers have the same forwarding behaviors is needed. This identical forwarding behavior is also known as forwarding equivalence. The capability to conduct quick, simultaneous equivalence verification on multiple router forwarding tables is vitally important to ensure efficient and effective network operations.

First, when router vendors develop, test, and run their router software and hardware, they must verify that the Forwarding Information Base (FIB) table in the data plane is correctly derived from the Routing Information Base (RIB) table in the control plane. A typical carrier-grade router consists of three primary components: (1) a control engine running various routing protocols, collecting routing information, and selecting the best routes to a master forwarding table, (2) many pieces of parallel forwarding engines, called line cards, and (3) a switch fabric linking the control engine and forwarding engines. Based on such a distributed system design, routers can achieve better scalability and reliability. This also results in at least three copies of the same routing table within a single router. One copy is in the control plane, also known as the master forwarding table, which contains the best routes selected by the RIB. Another copy, mirrored from the master forwarding table, resides in the local memory of each line card. The third copy is maintained in each forwarding ASIC chip, which is in charge of fast IP routing lookup and packet forwarding. In theory, the three copies of forwarding tables should have exactly identical forwarding behaviors. However, in reality, this may not always be true. Thus, a highly efficient forwarding table verification scheme is required for debugging and diagnosis purposes. Moreover, routing entries are frequently updated by neighbors and these changes need to be simultaneously reflected in all three copies of the forwarding table, which makes fast verification between the copies more challenging. For example, Cisco Express Forwarding (CEF) relies on real-time consistency checkers to discover prefix inconsistencies between RIB and FIB, due to the asynchronous nature of the distribution mechanism for both databases.

Second, when Internet Service Providers (ISPs) use FIB aggregation techniques to reduce FIB size on a linecard, they must ensure that the aggregated FIB yields 100% forwarding equivalence as the original FIB. The basic idea is that multiple prefixes, which share the same next hop or interface, can be merged into one. The best routes that are derived from routing decision processes, e.g., BGP decision process, will be aggregated according to the distribution of their next hops before they are pushed to the FIB. The aggregated copy of the routes with a much smaller size will then be downloaded to the FIB. Unlike many other approaches that require either architectural or hardware changes, FIB aggregation is promising because it is a software solution, local to single routers and does not require coordination between routers in a network or between different networks. However, the results yielded by the different FIB aggregation algorithms must be verified to determine if they have the same semantical forwarding as the original FIB, particularly in the case where there are many dynamic updates. Thus, there is a need for quick simultaneous equivalence verification on multiple forwarding tables to verify the correctness of FIB aggregation algorithms' implementation. Although the real-time requirement of equivalence verification is not very high here, it yields great theoretical value to design advanced algorithms to reduce CPU running time.

More generally, service providers and network operators may want to periodically check if two or more forwarding tables in their network cover the same routing space. Ideally, all forwarding tables in the same domain are supposed to yield the same set of routes to enable reachability between customers and providers. Otherwise, data packets forwarded from one router may be dropped at the next-hop receiving router, also known as "blackholes." The occurrence of blackhole may stem from any of a multitude of reasons, such as misconfigurations, slow network convergence, protocol bugs, and so forth. To this end, it must be verified or otherwise determined if two or more forwarding tables cover the same routing space with consistent routes. However, to do so, there are many challenges to overcome.

An efficient algorithm must first be able to verify forwarding equivalence over the entire IP address space, including 32-bit IPv4 and 128-bit IPv6, using the Longest Prefix Matching (LPM) rule in a super-fast manner. The LPM rule refers to a rule wherein the most specific routing entry and the corresponding next hop will be selected when there are multiple matches for the same packet. For example, in FIG. 1 (showing FIB table forwarding equivalence), one packet destined to 01100011 (assume 8-bit address space) has two routing matches "-" (0/0) with next hop A and 01 with next hop B. However, only the longest prefix 01 and the next hop B will be used to forward the packet out. When referring to forwarding equivalence, the next hops, derived from LPM lookups against all participating routing tables, should be identical for every IP address. Thus, the algorithm must cover the entire IP address ($2^{32}$ addresses for IPv4 and $2^{128}$ addresses for IPv6) quickly to check if the condition is satisfied.

An efficient algorithm must also be able to handle very large routing tables with a great number of routing entries. For instance, current IPv4 forwarding table size has been over 700,000 entries. IPv6 forwarding tables are fast growing in a super-linear trend (more than 40,000 entries as of July 2017). It is estimated that millions of routing entries will be present in the global routing tables in the next decade. A verification algorithm must be able to handle large routing tables efficiently.

Finally, an efficient algorithm must be able to mutually verify the forwarding equivalence over multiple forwarding tables simultaneously. For example, in FIG. 1, Table I(a)

shows two routing tables with different prefixes and next hops. The verification algorithm must be able to we quickly verify whether the routing tables, such as those in FIG. 1, yield forwarding equivalence or not under the aforementioned LPM rule. Further, the verification algorithm must be scalable to accommodate many tables at once while yielding good performance.

Currently, there are two known algorithms designed for Forwarding Table Equivalence Verification: (1) TaCo and (2) Normalization. The TaCo verification algorithm bears the following features: (1) uses separate Binary Trees (BTs) to store all entries for each forwarding/routing table; (2) was designed to compare only two tables at once; (3) has to leverage tree leaf pushing to obtain semantically equivalent trees; and (4) needs to perform two types of comparisons: (i) direct comparisons of the next hops for prefixes common between two tables and (ii) comparisons that involve LPM lookups of the IP addresses, extended from the remaining prefixes of each table. More specifically, TaCo needs to use four steps to complete equivalence verification for the entire routing space for Tables I(a) and I(b) (in FIG. 1): (i) Building a Binary Tree (BT) for each table, as shown in FIG. 2; (ii) BT Leaf Pushing (FIG. 3 shows the resultant BTs); (c) finding common prefixes and their next hops, then making comparisons; and (d) extending non-common prefixes found in both BTs to IP addresses and making comparisons.

When all comparisons end up with the equivalent results, TaCo theoretically proves that the two FIB tables yield semantic forwarding equivalence. As a result, TaCo undergoes many inefficient operations: (1) BT leaf pushing is time and memory consuming; (2) to find common prefixes for direct comparisons TaCo must traverse all trees and it is not a trivial task; (3) IP address extension and lookups for non-common prefixes are CPU-expensive; and (4) to compare n tables and find the entries that cause possible non-equivalence, it may require (n−1)*n times of tree-to-tree comparisons (e.g., for 3 tables A, B, C there are 6 comparisons: A vs B, A vs C, B vs C, B vs A, C vs B, C vs A). For instance, it may require 90 tree-to-tree combinations to compare 10 tables mutually. Therefore, there is a need to eliminate these expensive steps and accomplish the verification over an entire IP routing space through a single tree/trie traversal.

The Normalization verification algorithm is centered on the idea that a unique form of a BT can be obtained through Normalization, a procedure that eliminates brother leaves with identical labels (e.g., next hop values) from a leaf-pushed BT. Indeed, if a recursive substitution is applied to the BTs in FIG. 4, BT (a) and (b) will be identical. It is possible to prove that the set of tables with the same forwarding behavior have identical normalized BTs. More specifically, Normalization verification approach has three steps involved: (1) leaf pushing, (2) tree compression, and (3) side-by-side verification. Leaf pushing refers to formalizing a normal binary tree to a full binary tree, where a node is either a leaf node or a node with two children nodes. The leaf nodes' next hops are derived from their ancestors who have a next hop value originally. Tree compression involves compressing two brother leaf nodes that have the same values to their parent node. This is a recursive process until no brother leaf nodes have the same next hops. The final verification process will traverse every leaf node on both BTs to verify the forwarding equivalence side by side. FIG. 4 shows the normalized BTs after the first two steps. As can be observed, normalizing BTs to a unique form involves several inefficient operations including time-consuming leaf pushing and complicated leaf compression.

Therefore, there is a need for quick simultaneous equivalence verification on multiple forwarding tables to verify the correctness of FIB aggregation algorithms.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following description taken in conjunction with the accompanying drawings in which:

FIG. 1 is a FIB table forwarding equivalence;

FIG. 3 is the BTs of FIG. 2 after leaf pushing;

FIG. 6 is a table of trie node' attributes in the data structure;

FIG. 7 is a detailed workflow to build a joint PT for multiple tables;

FIG. 9 is the pseudocode of the recursive function VeriTable;

FIG. 11 is a graph of the running time of TaCo, Normalization, and VeriTable for both IPv4 and IPv6, respectively;

FIG. 12 is a graph of the number of total node accesses for both IPv4 and IPv6 scenarios;

FIG. 13 is a graph comparing total memory consumption for TaCo, Normalization, and VeriTable for both IPv4 and IPv6;

FIG. 14 is a table of results comparing 10 IPv4 tables simultaneously; and

FIG. 15 is a table of one-to-one comparisons of individual routing tables with the merged super table.

SUMMARY OF THE INVENTION

Figure 2:
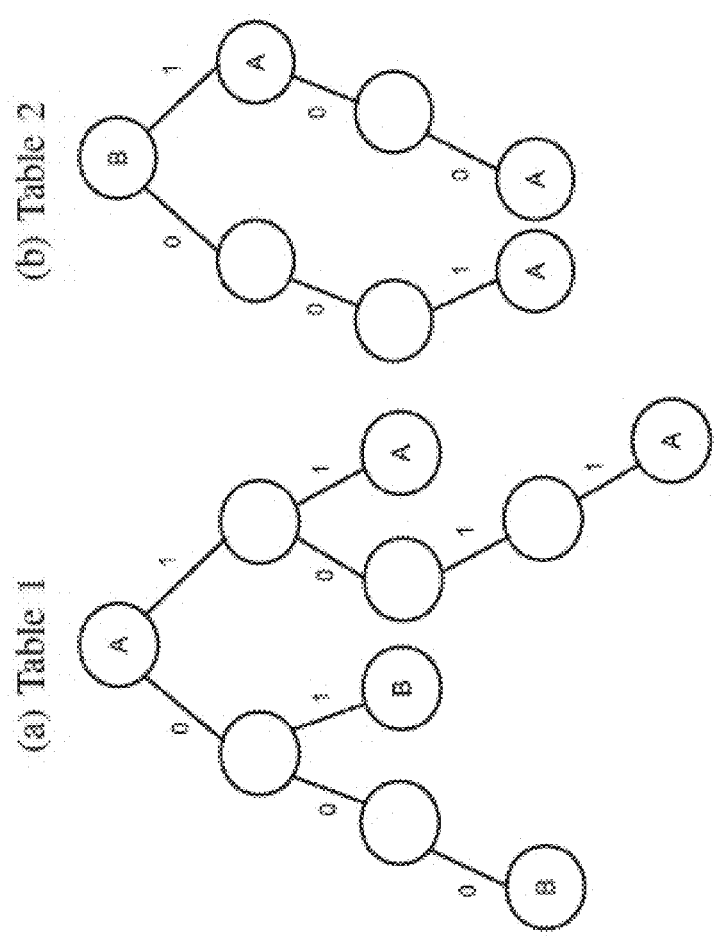
FIG. 2 is a Binary Tree (BT) for each FIB table of FIG. 1.
Figure 4:
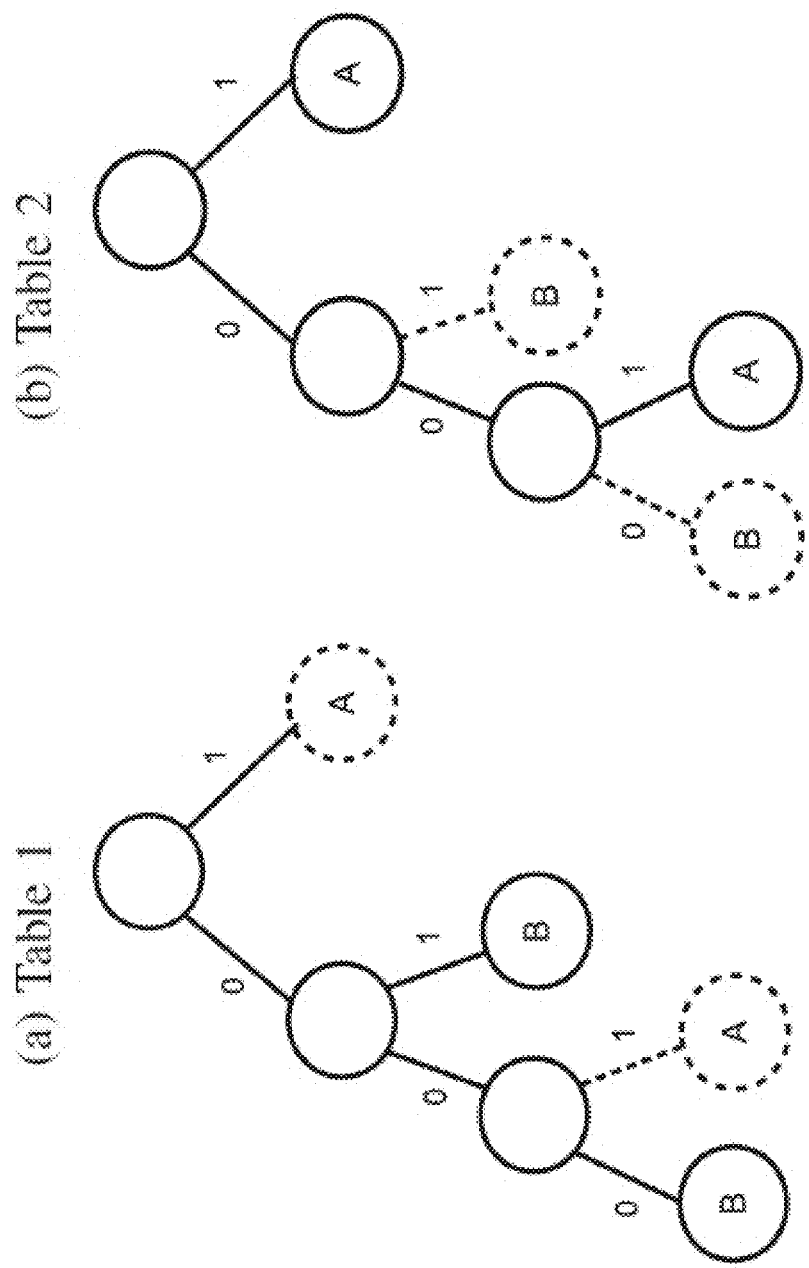
FIG. 4 is the BTs of FIG. 3 after Normalization.

The present invention is a new approach to verify multiple snapshots of arbitrary routing/forwarding tables simultaneously through a single data structure, a PATRICIA Trie traversal. The forwarding equivalence was examined over both real and large IPv4 and IPv6 routing tables. The performance of the VeriTable algorithm described herein significantly outperforms existing work TaCo and Normalization. For TaCo, VeriTable is 2 and 5.6 times faster in terms of verification time for IPv4 and IPv6, respectively, while it only uses 36.1% and 9.3% of total memory consumed by TaCo in a two-table scenario. For Normalization approach, VeriTable is 1.6 and 4.5 times faster for their total running time for IPv4 and IPv6, respectively. A relaxed version of the verification algorithm is able to quickly test if multiple forwarding tables cover the same routing space and determine the route leaking points, if needed.

The present invention is directed to systems and method for determining if multiple routing or forwarding tables yield the same or different forwarding behaviors. According to one aspect, the present invention is a hierarchical data structure. The hierarchical data structure includes a radix tree having a plurality of parent nodes and one or more child nodes. Each child node is associated with one of the plurality of parent nodes. There is a length difference between each child node and the one of the plurality of parent nodes and the length difference is equal to or greater than 1.

According to another aspect, the present invention is a method for building a hierarchical data structure. The method includes the steps of: (i) receiving a first forwarding table as an input, the first forwarding table comprising at least two fields, a prefix field and a next hop field; (ii) creating a first radix tree having a plurality of parent nodes and one or more child nodes based on the prefix field and next hop field in the first forwarding table, wherein each child node associated with at least one of the plurality of parent nodes; (iii) receiving a second forwarding table as an input, the second forwarding table comprising at least two fields, a prefix field and a next hop field; (iv) creating a second radix tree having a plurality of parent nodes and one or more child nodes based on the prefix field and next hop field in the second forwarding table, wherein each child node associated with one of the plurality of parent nodes; (v) merging the parent nodes of the first radix tree and the parent nodes of the second radix tree if they have the same prefix; (vi) merging the child nodes of the first radix tree and the child nodes of the second radix tree if they have the same prefix; (vii) storing a next hop from the next hop field of the first forwarding table and a next hop from the next hop field in the second forwarding table in an integer array if they have the same prefix; (viii) storing a next hop from the next hop field of the first forwarding table and a next hop from the next hop field in the second forwarding table in an integer array if they have the same prefix, wherein the integer array which is located at the parent node or child node having the same prefix as the next hop from the first or second forwarding tables.

According to yet another aspect, the present invention is a computer system for equivalence verification of multiple large forwarding tables. The computer system includes a memory for storing a hierarchical data structure and a processor coupled to the memory, for executing computer-executable instructions operable for creating the hierarchical data structure, comprising: (i) receiving a first forwarding table including two or more input fields, the two or more input fields define a parent-child relationship between a parent node and a child node based on a prefix; (ii) creating a first radix tree based on the parent-child relationship of the first forwarding table; (iii) receiving a second forwarding table including two or more input fields, the two or more input fields define a parent-child relationship between a parent node and a child node based on a prefix; (iv) creating a second radix tree based on the parent-child relationship of the second forwarding table; (v) merging the parent nodes of the first radix tree and the parent nodes of the second radix tree if they have the same prefix; and (vi) merging the child nodes of the first radix tree and the child nodes of the second radix tree if they have the same prefix.

These and other aspects of the invention will be apparent from and elucidated with reference to the embodiment(s) described hereinafter.

DETAILED DESCRIPTION OF THE INVENTION

Aspects of the present invention and certain features, advantages, and details thereof, are explained more fully below with reference to the non-limiting examples illustrated in the accompanying drawings. Descriptions of well-known structures are omitted so as not to unnecessarily obscure the invention in detail. It should be understood, however, that the detailed description and the specific non-limiting examples, while indicating aspects of the invention, are given by way of illustration only, and are not by way of limitation. Various substitutions, modifications, additions, and/or arrangements, within the spirit and/or scope of the underlying inventive concepts will be apparent to those skilled in the art from this disclosure.

Figure 5:
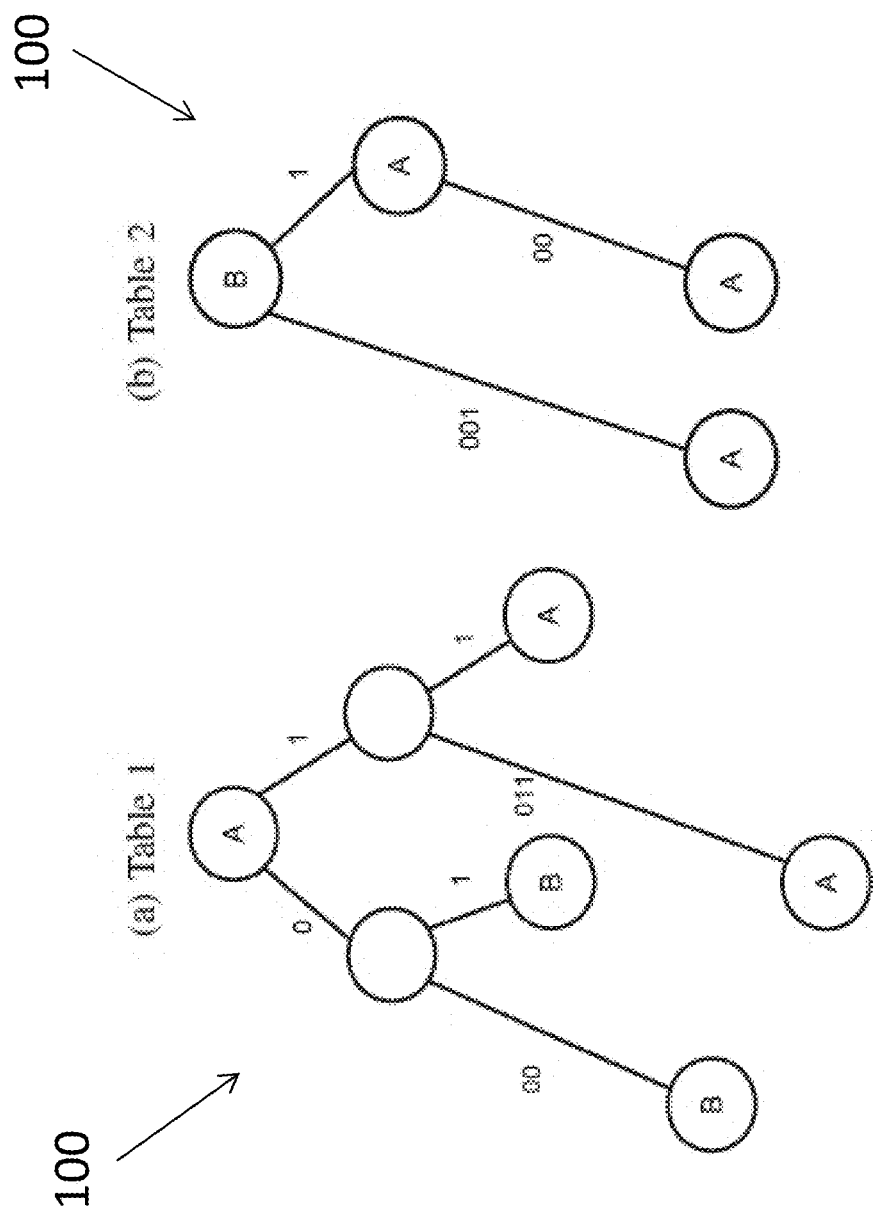
FIG. 5 is a PATRICIA Trie data structure.

Referring now to the figures, wherein like reference numerals refer to like parts throughout, FIG. 5 shows a PATRICIA Trie data structure, according to an embodiment. Instead of using a BT to store a forwarding table, a PATRICIA (Practical Algorithm to Retrieve Information Coded in Alphanumeric) Trie data structure is used. The PATRICIA Trie data structure is based on a radix tree using a radix of two. PATRICIA Trie (hereinafter "PT") is a compressed binary tree and can be quickly built and perform fast IP address prefix matching. For example, FIG. 5 depicts the corresponding PTs 100 for FIB Table I(a) and FIB Table I(b) of FIG. 1. The most distinguished part for a PT 100 is that the length difference between a parent prefix and its child prefix can be equal to and greater than 1. This is different than a BT, where the length difference must be 1. As a result, as shown in FIG. 5, PTs 100 only require 7 and 4 nodes, but BTs require 10 and 7 nodes for the two tables, respectively. While the differences for small tables are not significant, they are significant for large forwarding tables with hundreds of thousands of entries. An exemplar IPv4 routing table with 575,137 entries needs 1,620,965 nodes for a BT, but only needs 1,052,392 nodes for a PT (and a detailed comparison in terms of running time and memory consumption is provided below). These features enable a PT 100 to use less space and do a faster search, but result in more complicated operations in terms of node creations and deletions. For example, to add a new node with prefix 100 to the PT 100 for FIB Table I(a) in FIG. 5, an additional glue node would be needed to accomplish this task.

In order to build a PATRICIA Trie data structure, there are two primary tasks: (1) building and initializing a joint PT, and (2) verifying forwarding equivalence in a post-order traversal over the joint PT. Regarding the first step of building a joint PT for all routing/forwarding tables, rather than building multiple BTs for each individual table and comparing them in an one-to-one peering manner, as in TaCo and Normalization, an accumulated PT is built using all tables one upon another. When building the trie, a number of fields on each node are used to help make various decisions.

First, the first table is taken as input and all necessary fields are initiated to construct a PT accordingly. Afterward, during the joining process with other tables, the nodes with the same prefixes will be merged. Regarding next hops, an integer array is used to store hops for the same prefix, which is located at the same node. The size of the array is the same as the number of tables for comparison. The next hops cannot be merged because they may be different for the same prefix in different tables and also will be used for comparisons; thus, they will be placed at the corresponding nth element in the array starting from 0, where n is the index number of the input FIB table (assuming only one next hop for each distinct prefix in a FIB table).

Figure 8:
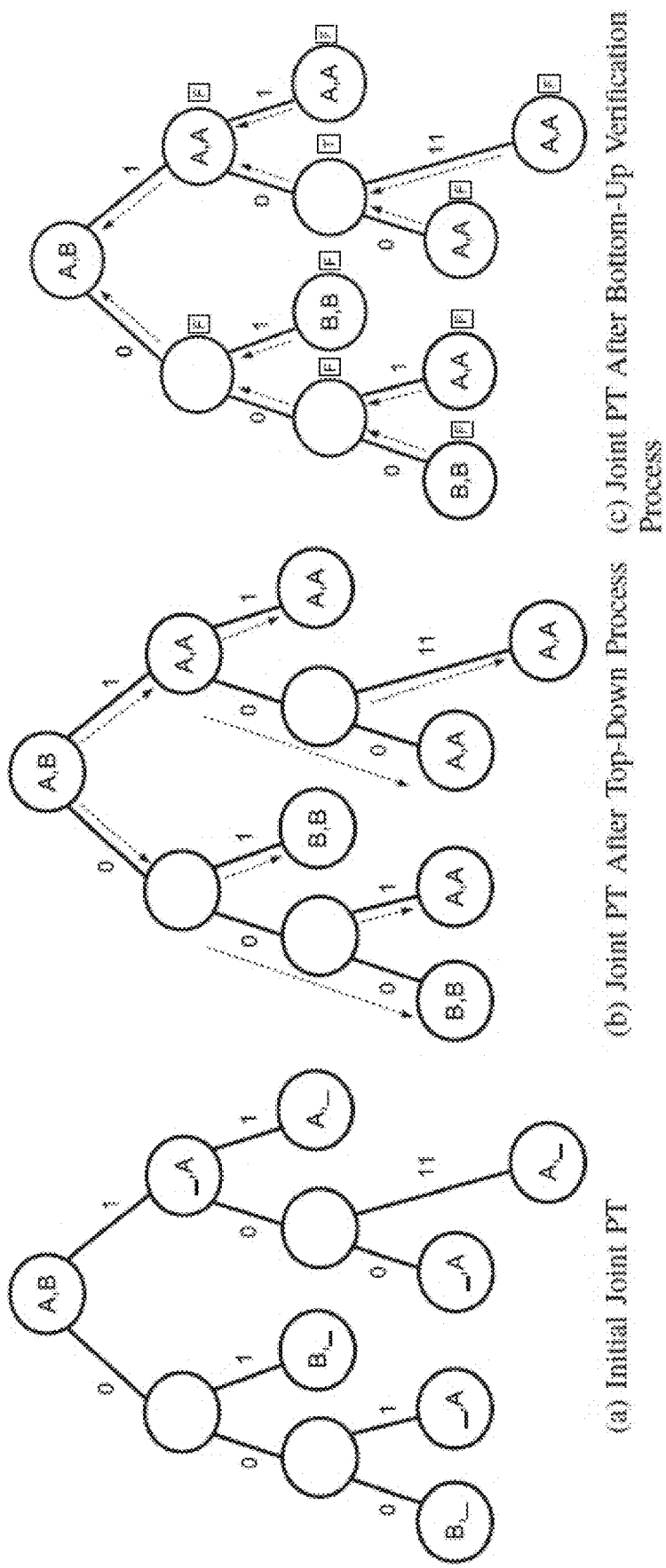
FIG. 8 is a resultant joint PT for FIB Table I(a) and I(b) in FIG. 1.

For instance, the next hop A of prefix 001 in FIB Table II in FIG. 6 will be assigned as the second element in the Next Hop Array on the node with prefix 001. If there is no next hop for a prefix in a particular table, the element value in the array will be initialized as "_" by default, or called "empty" next hop ("−1" used in an embodiment). If there is at least one "non-empty" next hop in the array, the Node Type value is marked as REAL, indicating this node contains a real prefix and next hop derived from one of the tables. Otherwise, it is called a GLUE node. Algorithm 1, shown in FIG. 7, elaborates the detailed workflow to build a joint PT for multiple tables. Table II in FIG. 6 describes a trie node's attributes in the data structure. FIG. 8(a) shows the resultant joint PT for FIB Table I(a) and I(b) in FIG. 1.

There are a few advantages for the design of a joint PT, including: (1) many common prefixes among different tables will share the same trie node and prefix, which can considerably reduce memory consumption and computational time for new node creations; (2) common prefixes and uncommon prefixes will be automatically gathered and identified in one single tree after the combination; and (c) the design will greatly speed up subsequent comparisons of next hops between multiple tables without traversing multiple tries.

After building the joint PT and initializing all necessary fields, the verification process is started. The verification process only needs one post-order PT traversal and includes two steps to accomplish the forwarding equivalence verification. The first step is top-down inheriting next hops, following a simple but very important rule: according to the LPM rule, the real next hop value for a prefix that has an "empty" next hop on the joint PT should be inherited from its closest REAL ancestor, whose next hop exists and is "non-empty." For example, to search the LPM matching next hop for prefix 000 in the second table using FIG. 8(a), the next hop value should return B, which was derived from the second next hop B of its nearest REAL ancestor—the root node.

The top-down process will help each specific prefix on a REAL node in the joint PT to inherit a next hop from its closest REAL ancestor if the prefix contains an "empty" next hop. More specifically, when moving down, the Next Hops array in the REAL ancestor node is compared with the array in the REAL child node. If there are elements in the child array with "empty" next hops, then the algorithm fills them out with the same values as the parent. If there are "non-empty" next hops present in the child node, then they are kept. Note that all GLUE nodes (hollow nodes in FIG. 8(a)) will be skipped during this process because they are merely ancillary nodes helping build up the trie structure and do not carry any next hop information.

After this step, every REAL node will have a new Next Hops array without any "empty" next hops. The instantiated next hops will facilitate the verification process without additional retrievals of next hops from their distant ancestors. FIG. 8(b) shows the results after the top-down step. If there is not a default route 0/0 in the original routing tables, one is made with next hop value 0 and node type REAL for calculation convenience.

The second step is to bottom-up verification of LPM next hops. In fact, this process is interwoven with the top-down process in a recursive post-order verification program. While the program moves downward, the top-down operations will be executed. While it moves upward, a series of operations will be conducted as follows. First, a leaf node at the bottom may be encountered, where the Next Hops array will be checked linearly, element by element. If there are any discrepancies, it can be immediately concluded that the forwarding tables yield different forwarding behaviors because the LPM prefixes end up with different next hops. In other words, they are not forwarding equivalent. If all next hops share the same value, it moves upward to its directly connected parent node, where the prefix length difference from the recently visited child node is checked.

Since a PT is used as the data structure, two cases may occur: d=1 and d>1, where d denotes the length difference between the parent node and the child node. The first case, d=1 for all children nodes, implies that the parent node has no extra routing space to cover between itself and the children nodes. On the contrary, the second case, d>1, indicates the parent node covers more routing space than that of all children nodes. If d d>1 happens at any time, a LEAK flag is set variable at the parent node to indicate that all of the children nodes are not able to cover the same routing space as the parent, which will lead to "leaking" certain routing space to check for verification. Therefore, in this case, the parent itself needs to be checked by the LPM rule to make sure the "leaking" routing space is checked as well. If there is no child for a given parent, it is considered as d>1.

As long as there is one LEAK flag initiated at a parent node, the flag will be carried over up to the nearest REAL node, which can be the parent node itself or a further ancestor. The verification process of forwarding equivalence will be conducted on the Next Hops array of this REAL node. Once the process passes over a REAL node, the flag will be cleared so that the "leaking" routing space will not be double checked. Intuitively, the forwarding equivalence is checked over the routing space covered by leaf nodes first, then over the remaining "leaking" routing space covered by internal REAL nodes.

FIG. 8(c) demonstrates the bottom-up LEAK flag setting and carried-over process. For example, d=2 between parent 10 and its child 1011, so the LEAK flag on node 10 will be set to True first. Since node 10 is a GLUE node, the LEAK flag will be carried over to its nearest REAL ancestor node 1 with the Next Hops array (A,A), where the leaking routing space will be checked and accordingly the LEAK flag will be cleared to False to avoid future duplicate checks.

In Algorithm 2, shown in FIG. 9, the pseudocode of the recursive function VeriTable is shown, which quickly verifies whether the multiple forwarding tables are equivalent or not. If not, the corresponding LPM prefixes and next hops will be printed out. The algorithm consists of both a top-down next hop inheritance process and a bottom-up LPM matching and verification process. The correctness of the algorithm has been mathematically proven; however, the proof is not provided herein.

Evaluation

The above described data structure was tested in experiments run on a machine with Intel Xeon Processor E5-2603 v3 1.60 GHz and 64 GB memory. Datasets were provided by the RouteViews project of the University of Oregon (Eugene, Oreg. USA). 12 IPv4 RIBs and 12 IPv6 RIBs were collected on the first day of each month in 2016, and used AS numbers as next hops to convert them into 24 routing/forwarding tables. By the end of 2016, there were about 633K IPv4 routes and 35K IPv6 routes in the global forwarding tables. An optimal FIB aggregation algorithm was then applied to these tables to obtain the aggregated forwarding tables. IPv4 yields a better aggregation ratio (about 25%) than IPv6 (about 60%), because IPv4 has a larger number of prefixes. The original and aggregated tables were semantically equivalent and used to evaluate the performance of the above-described VeriTable vs the state-of-the-art TaCo and Normalization verification algorithms in a two-table scenario. The following metrics were evaluated: (i) tree/trie building time, (ii) verification time, (iii) number of node accesses, and (iv) memory consumption.

Figure 10:
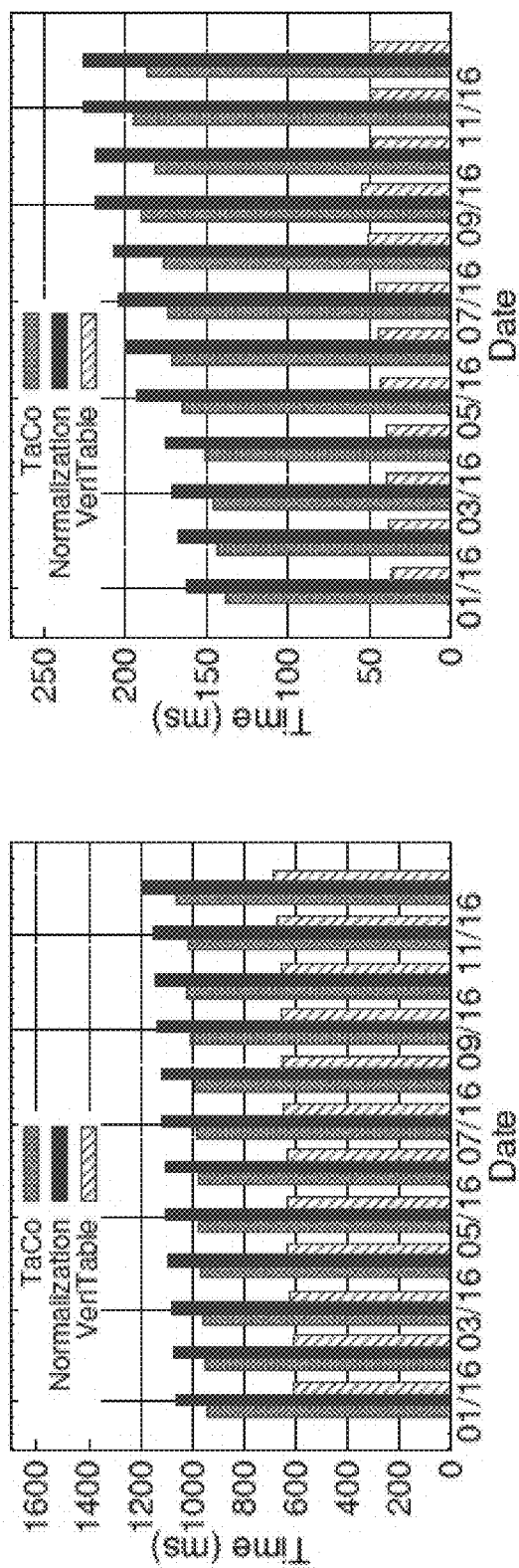
FIG. 10 is a graph of the building time for both IPv4 and IPv6.

Regarding tree/trie building time, TaCo, Normalization, and the VeriTable described herein all need to build their data structures using forwarding table entries before the verification process. TaCo and Normalization need to build two separate BTs while VeriTable only needs to build one joint PT. FIG. 10 shows the building time for both IPv4 and IPv6. The VeriTable algorithm outperforms TaCo and Normalization in both cases. In FIG. 10(a) for IPv4, TaCo uses minimum 939.38 ms and maximum 1065.41 ms with an average 986.27 ms to build two BTs. For Normalization, it is 1063.42 ms, 1194.95 ms and 1113.96 ms respectively. The VeriTable uses minimum 608.44 ms and maximum 685.02 ms with an average 642.27 ms to build a joint PT. VeriTable only uses 65.11% of the building time of TaCo and 57.65% of the building time of Normalization for IPv4 tables. In the scenario of IPv6 in FIG. 10(b), TaCo uses minimum 137.94 ms and maximum 186.73 ms with an average 168.10 ms to build two BTs; for Normalization these numbers are 162.40 ms, 225.75 ms and 197.25 ms. VeriTable uses minimum 36.39 ms and maximum 49.99 ms with an average 45.06 ms to build a joint PT. VeriTable only uses 26.78% and 22.84% of the building time of TaCo and Normalization, respectively, for IPv6 tables. Although IPv6 has much larger address space than IPv4, VeriTable yields much less building time under IPv6 than that of IPv4, which can be attributed to the small FIB size and the usage of a compact data structure—a joint PT in the algorithm described herein. Note the slower Normalization building time due to the operation of tree compression performed by that algorithm.

Regarding verification time, a valid verification algorithm needs to cover the whole routing space ($2^{32}$ IP addresses for IPv4 and $2^{128}$ IP addresses for IPv6) to check if two tables bear the same forwarding behaviors. The verification time to go through this process is one of the most important metrics that reflects whether the algorithm runs efficiently or not. FIG. 11 shows the running time of TaCo, Normalization, and VeriTable for both IPv4 and IPv6, respectively. VeriTable significantly outperforms TaCo in both cases. TaCo takes minimum 355.06 ms and maximum 390.60 ms with an average 370.73 ms to finish the whole verification process. VeriTable takes minimum 51.91 ms and maximum 57.48 ms with an average 54.63 ms to verify the entire IPv4 routing space. VeriTable only takes 14.73% of the verification time of TaCo for verification over two IPv4 tables. Taking building time into consideration, VeriTable is about 2 times faster than TaCo for IPv4 verification (1356 ms VS 696 ms). Normalization verification time for IPv4 tables is slightly faster than that of VeriTable (which is not the case for IPv6 tables). This is achieved due to the compression that shrinks the size of the BTs for verification process. However, Normalization has much longer building time than VeriTable. Overall, considering both building and verification time, VeriTable is faster than Normalization by 40% (696.90 ms VS 1154.08 ms) for IPv4 verification.

FIG. 11(b) shows the IPv6 scenario (note the Y-axis is a log scale). TaCo takes minimum 75.17 ms and maximum 103.18 ms with an average 92.79 ms to finish the whole verification process. For Normalization, it is 11.47 ms, 15.58 ms, 13.87 ms respectively. Our VeriTable takes minimum 1.44 ms and maximum 1.97 ms with an average 1.75 ms to verify the entire IPv6 routing space. VeriTable only takes 1.8% and 12.6% of the verification time of TaCo and Normalization, respectively, for verification over two IPv6 tables. Considering both building and verification time, VeriTable is 5.6 times faster than TaCo (261 ms VS 47 ms) and 4.5 times faster than Normalization (211 ms VS 47 ms) for IPv6 verification. The fundamental cause for such a large performance gap is due to the single trie traversal used in VeriTable over a joint PT with intelligent selection of certain prefixes for comparisons without tree normalization. Note that the leaf pushing operation over IPv6 routing table causes a significant inflation of the BTs which explains much slower speed of TaCo and Normalization verification for IPv6 tables than for IPv4 tables.

Regarding the number of node accesses, which are similar to memory accesses, refer to how many tree/trie nodes will be visited during verification. The total number of node accesses is the primary factor to determine the verification time of an algorithm. FIG. 12 shows the number of total node accesses for both IPv4 and IPv6 scenarios. Due to the novel design of VeriTable, we are able to control the total number of node accesses to a significantly low level. For example, node accesses range from 1.1 to 1.2 million for 580K and 630K comparisons, which is less than 2 node accesses per comparison for IPv4, and it yields similar results for IPv6. On the contrary, TaCo and Normalization requires a larger number of node accesses per comparison. For instance, TaCo bears 35 node accesses per comparison, on average, for IPv4 and 47 node accesses per comparison, on average, in IPv6. Normalization has 4 node accesses per comparison in both cases. There are two main reasons for the gaps between VeriTable and TaCo and Normalization: (1) VeriTable uses a joint PT but TaCo and Normalization use separate BTs and in a BT, it only goes one level down for each search step while multiple levels down in a PT; and (2) VeriTable conducts only one post-order PT traversal. TaCo conducts many repeated node accesses over a BT, including searching for a match from the BT root, using simply longest prefix matching process for each comparison. Due to the unique form of a normalized BT, Normalization requires no mutual IP address lookups and thus conducts significantly less node accesses than TaCo.

Finally, memory consumption is another important metric to evaluate the performance of algorithms. FIG. 13 shows the comparisons between TaCo, Normalization, and VeriTable for both IPv4 and IPv6 in terms of their total memory consumptions. In both scenarios, VeriTable outperforms TaCo and Normalization significantly. VeriTable only consumes around 38% (80.86 MB) of total memory space than that of TaCo and Normalization (223 MB) on average for the same set of IPv4 forwarding tables. In the IPv6 case, VeriTable bears even more outstanding results, which only consumes 9.3% (4.9 MB) of total memory space than that of TaCo (53 MB) and Normalization on average. The differences in memory consumption by VeriTable, Normalization, and TaCo are caused by the unique combined trie data structure used in VeriTable. A node in Normalization and TaCo holds a single next hop instead of an array of next hops because TaCo and Normalization build separate BTs for each forwarding table. Moreover, those BTs inflate after leaf pushing. Overall, the design of the verification algorithm described herein, VeriTable, outperforms TaCo and Normalization in all aspects, including total running time, number of node accesses, and memory consumption.

The performance of VeriTable was also evaluated to check the forwarding equivalence and differences over multiple forwarding tables simultaneously. In the experiments, 2000 distinct errors were intentionally added when a new forwarding table was added. Then, it was verified that the same number of errors were detected by VeriTable algorithm. Starting from 2 tables, tables were gradually checked, up to 10 tables simultaneously. The evaluation results have been shown in Table III in FIG. 14. There are two primary observations. First, VeriTable is able to check the whole address space very quickly over 10 large forwarding tables (336.41 ms) with relatively small memory consumptions (165 MB). Second, the building time, verification time, node accesses, and memory consumptions grow much slower as compared to the total number of forwarding entries. This indicates that VeriTable can scale quite well for equivalence checking of a large number of tables. On the contrary, TaCo and Normalization were not naturally designed to compare multiple forwarding tables. In theory, TaCo may need n*(n−1) table-to-table comparisons to find the exact entries that cause differences, which is equal to 90 comparisons for this 10-table scenario. On the other hand, Normalization needs additional decompression steps to find such entries.

A relaxed version with minor changes of the VeriTable algorithm is able to quickly detect the routing space differences between multiple FIBs. More specifically, after building the joint PT for multiple FIBs, VeriTable goes through the same verification process recursively. When traversing each Next Hops array, it checks if there is a scenario where the array contains at least one default next hop (the next hop on default route 0/0) and at least one non-default next hop. If yes, it indicates that at least one FIB misses some routing space while another FIB covers it, which may lead to routing "blackholes." In experiments, data from RouteViews project was used wherein 10 routing tables that contain the largest number of entries were collected and then merged to a super routing table with 691,998 entries. Subsequently, a one-to-one comparison was conducted for the routing spaces of the 10 individual routing tables with the super routing table. The results of these comparisons show (in detail, in Table IV of FIG. 15) that none of these 10 routing tables fully cover the routing space of the merged one. The Leaking Routes in Table IV (FIG. 15) were calculated by the number of subtrees in the joint PT under which an individual routing table "leaks" certain routes but the merged super routing table covers them. These facts imply that the potential routing blackholes may take place between routers in the same domain or between different domains. To this end, the VeriTable verification algorithm can identify these potential blackholes efficiently. On the contrary, TaCo and Normalization may not be easily used to detect block holes and loops because different FIBs may result in different shapes of BTs (even normalized), which makes it hard for comparison.

In conclusion, the TaCo algorithm is designed to verify forwarding equivalence between two routing tables. However, TaCo builds two separate binary trees for two tables and performs tree normalization and leaf-pushing operations, whereas VeriTable is very different. VeriTable builds a single joint PATRICIA Trie for multiple tables and leverages novel ways to avoid duplicate tree traversals and node accesses and thus outperforms TaCo in all aspects. Inconsistency of routing tables within one network may lead to different types of problems, such as blackholes, looping of IP packets, packet losses and violations of forwarding policies. Network properties that must be preserved to avoid misconfiguration of a network can be defined as a set of invariants. Anteater is a testing framework that converts the current network state and the set of invariants into instances of boolean satisfiability problem (SAT) and resolves them using heuristics-based SAT-solvers. Libra is a tool to address data skew problems and uses MapReduce (a tool for parallel data processing) to analyze rules from routing tables on a network in parallel. Due to the distributed model of MapReduce, Libra analyzes the routing tables significantly faster than Anteater. VeriFlow (a network verification tool) leverages software-defined networking to collect forwarding rules and then slice the network into Equivalence classes (ECs). NetPlumber is a real-time network analyzer based on Header Space Analysis protocol-agnostic framework and is compatible with both SDN and conventional networks. It incrementally verifies the network configuration upon every policy change in a quick manner. Different from the network-wide verification methods above, VeriTable aims to determine whether multiple static forwarding tables yield the same forwarding behaviors-given any IP packet with a destination address or they cover the same routing space.

All definitions, as defined and used herein, should be understood to control over dictionary definitions, definitions in documents incorporated by reference, and/or ordinary meanings of the defined terms.

While various embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific embodiments described herein. It is, therefore, to be understood that the foregoing embodiments are presented by way of example only and that, within the scope of the appended claims and equivalents thereto, embodiments may be practiced otherwise than as specifically described and claimed. Embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprise" (and any form of comprise, such as "comprises" and "comprising"), "have" (and any form of have, such as, "has" and "having"), "include" (and any form of include, such as "includes" and "including"), and "contain" (any form of contain, such as "contains" and "containing") are open-ended linking verbs. As a result, a method or device that "comprises", "has", "includes" or "contains" one or more steps or elements. Likewise, a step of method or an element of a device that "comprises", "has", "includes" or "contains" one or more features possesses those one or more features, but is not limited to possessing only those one or more features. Furthermore, a device or structure that is configured in a certain way is configured in at least that way, but may also be configured in ways that are not listed.

The corresponding structures, materials, acts and equivalents of all means or step plus function elements in the claims below, if any, are intended to include any structure, material or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of one or more aspects of the invention and the practical application, and to enable others of ordinary skill in the art to understand one or more aspects of the present invention for various embodiments with various modifications as are suited to the particular use contemplated.

What is claimed is:

1. A method for building a hierarchical data structure, comprising the steps of:
   receiving a first forwarding table as an input, the first forwarding table comprising at least two fields, a prefix field and a next hop field;
   creating a first radix tree having a plurality of parent nodes and one or more child nodes based on the prefix field and next hop field in the first forwarding table, wherein each child node associated with at least one of the plurality of parent nodes;
   receiving a second forwarding table as an input, the second forwarding table comprising at least two fields, a prefix field and a next hop field;
   creating a second radix tree having a plurality of parent nodes and one or more child nodes based on the prefix field and next hop field in the second forwarding table, wherein each child node associated with one of the plurality of parent nodes;
   merging the parent nodes of the first radix tree and the parent nodes of the second radix tree if they have the same prefix;
   merging the child nodes of the first radix tree and the child nodes of the second radix tree if they have the same prefix;
   storing a next hop from the next hop field of the first forwarding table and a next hop from the next hop field in the second forwarding table in an integer array if they have the same prefix; and
   wherein the integer array which is located at the parent node or child node having the same prefix as the next hop from the first or second forwarding tables.

2. The method of claim 1, wherein the step of storing the next hop includes the step of:
   placing the next hops from the first and second forwarding tables at the corresponding nth element in the integer array, starting at 0.

3. The method of claim 2, wherein n is an index number of the input first and second forwarding tables.

4. The method of claim 1, wherein the step of storing the next hop includes the step of:
   placing an empty value in the integer array if there is no next hop for a prefix in the first and second forwarding tables.

5. The method of claim 1, wherein the size of the integer array is the same as the number of forwarding tables.

6. The method of claim 1, wherein there is a length difference between each child node and the one of the plurality of parent nodes in each of the first and second radix trees and the length difference is equal to or greater than 1.

7. The method of claim 1, wherein the first radix tree and the second radix tree both have a radix of two.

8. A computer system for equivalence verification of multiple large forwarding tables, comprising:
   a memory for storing a hierarchical data structure;
   a processor coupled to the memory, for executing computer-executable instructions operable for creating the hierarchical data structure, comprising:
   receiving a first forwarding table including two or more input fields, the two or more input fields define a parent-child relationship between a parent node and a child node based on a prefix;
   creating a first radix tree based on the parent-child relationship of the first forwarding table;
   receiving a second forwarding table including two or more input fields, the two or more input fields define a parent-child relationship between a parent node and a child node based on a prefix, wherein the first and second forwarding tables each comprise an input field with a next hop value;
   creating a second radix tree based on the parent-child relationship of the second forwarding table;
   merging the parent nodes of the first radix tree and the parent nodes of the second radix tree if they have the same prefix;
   merging the child nodes of the first radix tree and the child nodes of the second radix tree if they have the same prefix; and
   storing a next hop value from the first and second forwarding tables in an integer array if they have the same prefix.

9. The computer system of claim 8, wherein the integer array which is located at the parent node or child node having the same prefix as the next hop.

* * * * *